HENRY S. COX.

Improvement in Thill Couplings.

No. 121,593. Patented Dec. 5, 1871.

ATTEST:
Myron H. Church
Harry Sprague

INVENTOR:
Henry S. Cox
per atty
Thos. S. Sprague 121,593

UNITED STATES PATENT OFFICE.

HENRY S. COX, OF FRANKLIN, MICHIGAN.

IMPROVEMENT IN THILL-COUPLINGS.

Specification forming part of Letters Patent No. 121,593, dated December 5, 1871.

*To all whom it may concern:*

Be it known that I, HENRY S. COX, of Franklin, in the county of Oakland and State of Michigan, have invented a new and useful Improvement in Shaft and Pole Couplings; and I do declare that the following is a true and accurate description thereof, reference being had to the accompanying drawing and to the letters of reference marked thereon and being a part of this specification, in which—

Figure 1:
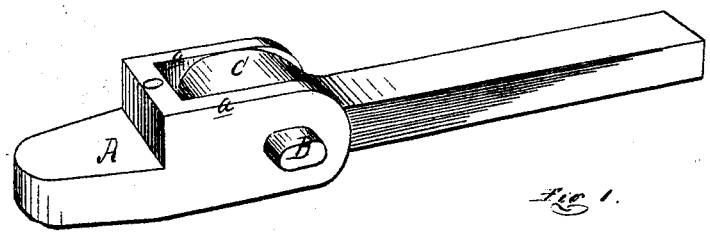
Figure 2:
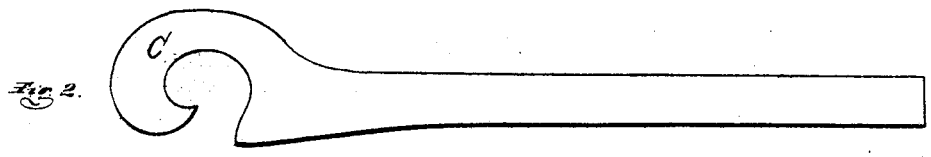
Figure 3:
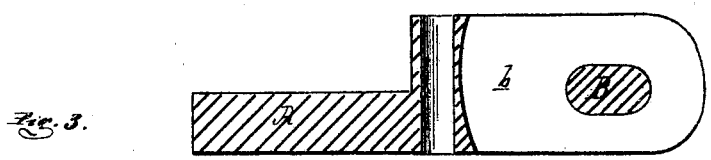

Figure 1 is a perspective view of my invention. Fig. 2 is a side elevation of the hook. Fig. 3 is a longitudinal vertical section of the clip and pin.

Like letters refer to like parts in each figure.

The nature of this invention relates to the peculiar construction of a coupling, by means of which shafts or poles may be so attached to wagons or carriages and so arranged that the pole or shafts cannot be attached or detached, except when raised vertically to a position at right angles with the axle, to which the clip is secured. The invention consists in a combination of an elongated hook with an elongated or flattened pin, as more fully hereinafter set forth.

In the accompanying drawing, A represents a clip, the two walls of which, a, are connected by an elongated or flattened pin, B, a suitable recess, b, being left behind the pin for the insertion of the hook C, which is elongated, as shown.

To engage the hook with the pin, raise it to a vertical position and at right angles with the pin; then insert the hook in the recess b and engage it with the pin, when it should be dropped to a horizontal position. A reverse motion will disengage the hook.

The use of this coupling will entirely prevent any accidental detachment of the shafts or pole from a wagon or carriage under any circumstances.

What I claim as my invention, and desire to secure by Letters Patent, is—

The combination of the elongated hook C with the elongated or flattened pin B of a clip, A, provided with a recess, b, when the several parts are constructed and arranged to operate substantially as and for the purposes herein set forth.

HENRY S. COX.

Witnesses:
THOS. S. SPRAGUE,
MYRON H. CHURCH.

(31)